US006424935B1

(12) United States Patent
Taylor (10) Patent No.: US 6,424,935 B1
(45) Date of Patent: Jul. 23, 2002

(54) TWO-WAY SPEECH RECOGNITION AND DIALECT SYSTEM

(75) Inventor: George W. Taylor, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/628,754

(22) Filed: Jul. 31, 2000

(51) Int. Cl.[7] .......................... G06F 17/21; G10L 15/26; G10L 15/08
(52) U.S. Cl. .......................... 704/10; 704/235; 704/251; 704/257
(58) Field of Search ................................ 704/231–236, 704/10, 251–257

(56) References Cited

U.S. PATENT DOCUMENTS

| | | | | |
|---|---|---|---|---|
| 5,428,707 A | * | 6/1995 | Gould et al. | 704/231 |
| 5,553,119 A | * | 9/1996 | McAllister et al. | 704/231 |
| 5,636,325 A | * | 6/1997 | Farrett | 704/231 |
| 5,870,709 A | * | 2/1999 | Bernstein | 704/270 |
| 5,946,658 A | * | 8/1999 | Miyazawa et al. | 704/258 |
| 6,100,882 A | * | 8/2000 | Sharman et al. | 704/235 |
| 6,173,266 B1 | * | 1/2001 | Marx et al. | 704/270 |
| 6,336,108 B1 | * | 1/2002 | Thiesson et al. | 704/256 |

OTHER PUBLICATIONS

Huggins et al ("The use of shibboleth words for automatically classifying speakers by dialect"—Huggins, A.W.F.; Patel, Y., Fourth International Conference on Spoken Language, Oct. 3–6, 1996.).*

Price et al ("The DARPA 1000–Word Resource Management Database for Continuous Speech Recognition"—Price, P. Fisher, W.M.; Bernstein, J.; Pallett, D.S. International Conference on Acoustics, Speech, and Signal Processing, Apr. 11–14, 1988.).*

DEC VAX/VMS Phone ("Vax/VMS Phone Utility Reference Manual AA–Z427A–TE", Digital Equipment Corporation, 1984, excerpt provided from University of Houston).*

* cited by examiner

Primary Examiner—Richemond Dorvil
Assistant Examiner—Daniel A. Nolan
(74) Attorney, Agent, or Firm—Knobbe Martens Olson & Bear ,L LP (57) ABSTRACT

A speech-to-text conversion system. The two-way speech recognition and dialect system comprises a computer system, an attached microphone assembly, and speech-to-text conversion software. The two-way speech recognition and dialect system includes a database of dialectal characteristics and queries a user to determine their likely dialect. The system uses this determination to reduce the time for the system to reliably transcribe a user's speech into text and to anticipate dialectal word usage. In another embodiment of the invention, the two-way speech recognition and dialect system is capable of transcribing the speech of multiple speakers while distinguishing between the different speakers and identifying the text belonging to each speaker.

30 Claims, 5 Drawing Sheets

TWO-WAY SPEECH RECOGNITION AND DIALECT SYSTEM

BACKGROUND OF THE INVENTION

1. Field of the Invention

The present invention relates to the field of computer systems and in particular to a speech-to-text converter with a dialect database and two-way speech recognition capability.

2. Description of the Related Art

Many routine tasks require generating and utilizing written text. This is typically done by typing text into a computer via a keyboard. Typing text into a computer allows the computer to perform a variety of useful tasks such as checking the text for spelling and grammar. The computer generated text can be incorporated into other documents, sent to other people via e-mail systems, or posted to the Internet. Typing text by keyboard has the disadvantage that it requires the operator to use both hands for optimal typing speed, thereby preventing them from using their hands for any other task. Typing is an acquired skill and can take significant time and practice to attain a relatively high rate of typing. In addition, even a skilled typist can only type at ¼ to ½ the rate of normal speech. Thus, it is generally not possible for a typist to transcribe a normal flowing conversation at the same rate it is spoken.

One method developed to allow faster transcription is stenography. Stenography is a shorthand manner of identifying words and representing them with alternative symbols. Stenography involves the use of a stenography machine. A skilled stenographer can easily keep up with transcribing a conversation as it is spoken. However, stenography also has some significant disadvantages. Stenography is a learned skill and a stenographer requires a significant amount of instruction and practice to become proficient. In addition the stenography symbols are not the same as the normal alphabet and are illegible to one not skilled as a stenographer. Stenography symbols are also not typically understood by most commonly available computer applications or e-mail servers.

Speech recognition and speech-to-text conversion have been developed to generate text more rapidly while keeping the user's hands free for other tasks. Speech recognition involves hardware and software that is capable of receiving a spoken sound pattern and matching it with a particular word, phrase, or action. Speech-to-text conversion is a more elaborate system that is capable of continuously performing speech recognition but in such a manner that it is capable of converting a spoken conversation or discourse to corresponding text that is comparable to what a typist at a keyboard would do, but more rapidly. Current speech-to-text systems are capable of following a natural conversation and generating corresponding text with a relatively low rate of errors with some limitations.

One difficulty current speech-to-text systems have is correctly interpreting variations in speech when the meaning stays constant. A given person will tend to pronounce words slightly differently at different times. As they become excited, they tend to speak more rapidly. Many people tend to slur words together or to partially drop phonemes from their pronunciation. For example, "Howareya" instead of "How are you" or "bout" instead of "about". This is a particular problem with English because with the example of "bout" versus "about" they are both proper English words but with quite different meanings. A human speaker is familiar with the vagaries of typical human speech and would readily make the correct interpretation in this case, but a machine has a more difficult time making the distinction.

Some speech-to-text systems address this problem by "learning" a particular person's speech patterns. This is typically done by sampling the person's speech and matching that speech with corresponding text or actions. This type of speech recognition or speech-to-text is called speaker dependent. Many speaker dependent systems provide a correction feature enabling them to iteratively improve the conversion of a person's speech to corresponding text. Speaker dependent systems can require several hours of training before the system is capable of reliably converting the person's speech to text.

Different people will tend to pronounce the same words differently and use different phrasing. Oftentimes the variations in people's speech patterns follow predictable and identifiable patterns by groups such as: the place that the speakers grew up in, their age or gender, or their profession or type of work they do. These variations in pronunciation and word use are referred to as dialects. A dialect is typically distinguished by the use or absence of certain words or phrasing. A dialect will also typically have predictable manners of pronouncing certain syllables and/or words. It can be appreciated that the predictable nature of a dialect could be used to facilitate the learning process for a speaker dependent speech-to-text converter.

Another limitation of a speaker dependent system is that it is generally only reliable with the speech patterns of the person who trained it. A speaker dependent system typically has significantly poorer performance with speakers other than the trainer, often to the point that it is no longer useful unless trained with another user. Each new user needs to teach the speech-to-text system their unique speech patterns which again can take several hours. The speech-to-text system must also store the voice pattern files of the different speakers, which takes up limited memory capacity. It can be appreciated that in circumstances with multiple speakers a speech-to-text system that is capable of minimizing the time required for training for each speaker would be an advantage.

In several situations, a desirable feature for speech-to-text systems is the ability to not only correctly transcribe the speech of multiple speakers but also to distinguish the multiple speakers. One example would be courtroom transcription, wherein several attorneys, the judge, and parties to the case would have occasion to speak and wherein an accurate transcription of what is said and by whom needs to be made to record the proceedings. A second example is a telephone customer assistance line where a company would like a written record of customers' calls to assess their employees and track and evaluate customer concerns and comments. It can be appreciated that the transcription of the conversations in these cases should be unobtrusive to the participants and should not interfere with the main business at hand.

Speech-to-text systems can be provided with more extensive libraries of speech patterns and more sophisticated recognition algorithms to enable them to convert more reliably the speech of multiple users to text. However, these systems become increasingly demanding of computer processor power and memory capacity as their flexibility increases. The more capacious processors and memory increase the cost of the systems. In addition, more complicated algorithms can slow a system down to the point that it is no longer capable of keeping up with a normal conversation.

It can be appreciated that there is an ongoing need for a method of reducing the time needed to train a speech-to-text conversion system and for providing less expensive speech-to-text conversion systems. There is a further need for speech-to-text conversion that can reliably transcribe the speech of multiple speakers and be able to correctly match the converted text with the speaker. The system and method should be cost effective to implement and not require extensive additional hardware.

SUMMARY OF THE INVENTION

The aforementioned needs are satisfied by the two-way speech recognition and dialect system of the present invention which, in one aspect, comprises a system for receiving spoken sounds and converting them into written text. The system includes a dialect database which is used to narrow the expected tonal qualities of the speaker and reduce the time required for the system to reliably transcribe the speaker's speech. The two-way speech recognition and dialect system allows for determining the dialectal characteristics of a user. In one embodiment, the two-way speech recognition and dialect system includes the ability to distinguish between multiple speakers based on their dialectal speech characteristics.

In one embodiment, the two-way speech recognition and dialect system comprises a microphone, memory, a microprocessor, at least one input device, and at least one user interface. The microphone allows the speech input of the user to be transduced into electrical signals. The microprocessor processes the input from the microphone and other devices. The microprocessor also performs the speech recognition and text conversion actions of the system. The memory stores the "learned" vocal patterns of the user as well as a plurality of dialectal speech characteristics. The input device(s) and user interface(s) allow the user to interact with the two-way speech recognition and dialect system.

In this embodiment, the two-way speech recognition and dialect system provides dialect determination by posing a series of questions to the user. The questions can branch depending on the respondent's answers. In one embodiment, the questions attempt to determine the likely dialectal characteristics of the speaker by asking a series of questions indicative of the speaker that relate to speaking style. These questions can include questions determining the speaker's age, gender, level of education, type of work that they do, where they grew up, where they live now and for how long, whether they are a native speaker of the language, and if not what their native language is.

The two-way speech recognition and dialect system uses the responses to these parameter questions to determine the dialect that the user likely has. The two-way speech recognition and dialect system then uses the likely dialect to narrow the speech patterns to expect for the user. For example, the speech patterns and vocabulary of a young, working class female from rural South Carolina are likely to be quite different than those of an older male doctor from Bombay, India. The two-way speech recognition and dialect system uses this information to narrow the expected tonal range of the speaker and anticipate certain pronunciations and word uses. Thus, the learning period for the two-way speech recognition and dialect system is shorter than for a generic speaker dependent speech-to-text conversion system.

Another embodiment of the present invention adds the ability to transcribe the speech of multiple users and the ability to identify and distinguish the speakers. The two-way speech recognition and dialect system monitors the pronunciation of the speakers and determines the dialectal differences between the speakers. The two-way speech recognition and dialect system uses these differences to determine who is speaking at any given time. Thus the two-way speech recognition and dialect system can distinguish between the speakers and identify the origin of each segment of transcribed speech. The two-way speech recognition and dialect system can number the text from each speaker or present the text on a monitor in different colors or fonts for the different speakers so that the transcribed text for each speaker can be readily distinguished.

These and other objects and advantages of the present invention will become more fully apparent from the following description taken in conjunction with the accompanying drawings.

DETAILED DESCRIPTION OF THE PREFERRED EMBODIMENT

Figure 1:
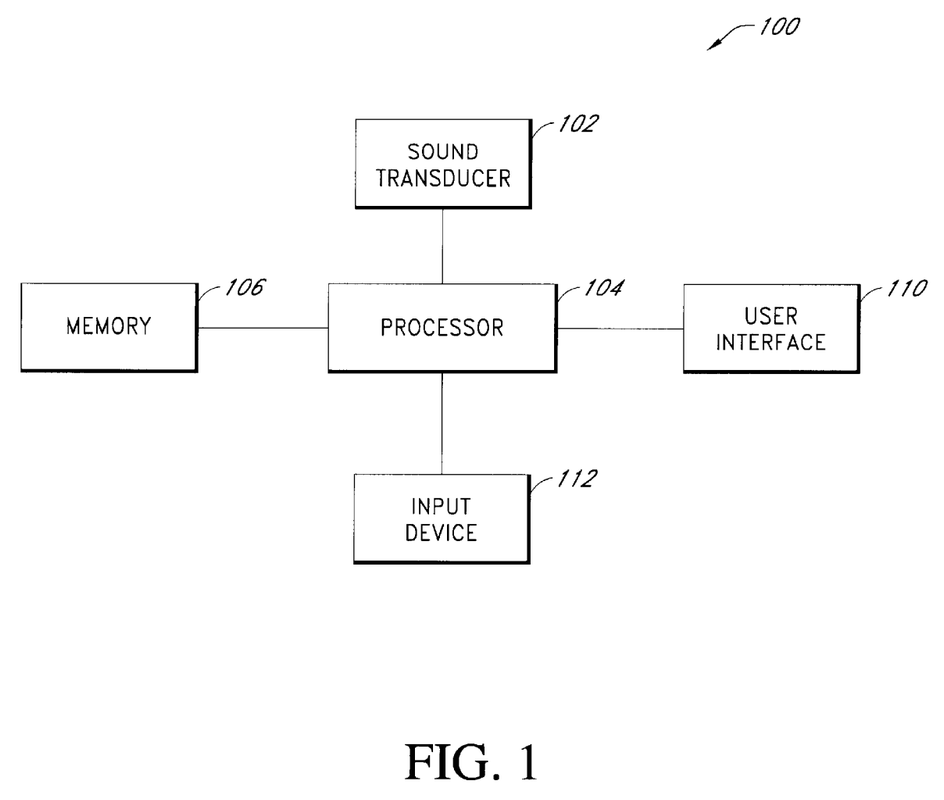
FIG. 1 shows a block diagram of the hardware components of the two-way speech recognition and dialect system.

Reference will now be made to the drawings wherein like numerals refer to like parts throughout. FIG. 1 shows a block diagram of the hardware components of a typical two-way speech recognition and dialect system 100. The two-way speech recognition and dialect system 100 is adapted to receive audio input and convert the audio input into corresponding text in a manner that is well understood in the art. The two-way speech recognition and dialect system 100 is capable of learning the individual vocal characteristics of a user and also includes a database of dialectal characteristics. The two-way speech recognition and dialect system 100 queries a user to obtain dialectal parameters used to determine their dialectal characteristics. By pre-determining the user's dialectal characteristics, the two-way speech recognition and dialect system 100 reduces the duration of the learning period to recognize spoken words in a manner which will be described in greater detail below.

The two-way speech recognition and dialect system 100 comprises a sound transducer 102. The sound transducer 102 is adapted to accurately transduce sounds in the normal range of human hearing from approximately 20 Hz to 20 kHz and send a corresponding analog electrical signal to a processor 104 in a manner well known in the art. It can be appreciated that the performance of the two-way speech recognition and dialect system 100 is dependent on the quality of the signal provided to the two-way speech recognition and dialect system 100 by the sound transducer 102.

The processor 104 is adapted to control the operation of the two-way speech recognition and dialect system 100 in a manner that will be described in greater detail below. The sound transducer 102 is connected to the processor 104 and the processor 104 is provided with interface circuitry to amplify, filter, and digitize the input from the sound transducer 102 in a manner well known by those skilled in the art.

The two-way speech recognition and dialect system 100 also comprises memory 106. The memory 106 stores a dialect database and the learned speech patterns of the users in a manner that will be described in greater detail below. The memory 106 is connected to the processor 104 and adapted to receive, store, and recall data to the processor 104 in a manner well understood in the art.

The two-way speech recognition and dialect system 100 also comprises at least one user interface 110. The user interface 110 can comprise a monitor, speaker, or any other devices for delivering information to a user. The user interface 110 provides queries to the user and displays the generated text resulting from the speech-to-text conversion in a manner that will be described in greater detail below. The user interface 110 is connected to the processor 104 in a manner well understood in the art.

The two-way speech recognition and dialect system 100 also comprises at least one input device 112. The input device 112 can comprise a keyboard, mouse, touchscreen, or any other devices for providing input to a computer system. The input device 112 is connected to the processor 104 in a manner well known to those skilled in the art. The user interface 110 provides means for a user to provide answers to queries posed by the two-way speech recognition and dialect system 100 and to correct generated text as needed in a manner that will be described in greater detail below.

The components and operation of two-way speech recognition system 100 described thus far is substantially similar to the components and operation of currently available speech recognition systems, such as Dragon Naturally Speaking™, which is commercially available. These systems are capable of receiving an audio signal, translating it into an equivalent digital signal, and then comparing the resulting digitized signal to a library of corresponding digitized signals in order to determine a spoken text word that matches the original audio signal. It will be appreciated from the following discussion that any of a number of different currently available algorithms for matching audio sounds to text can be used to implement this embodiment without departing from the spirit of the present invention.

Figure 2:
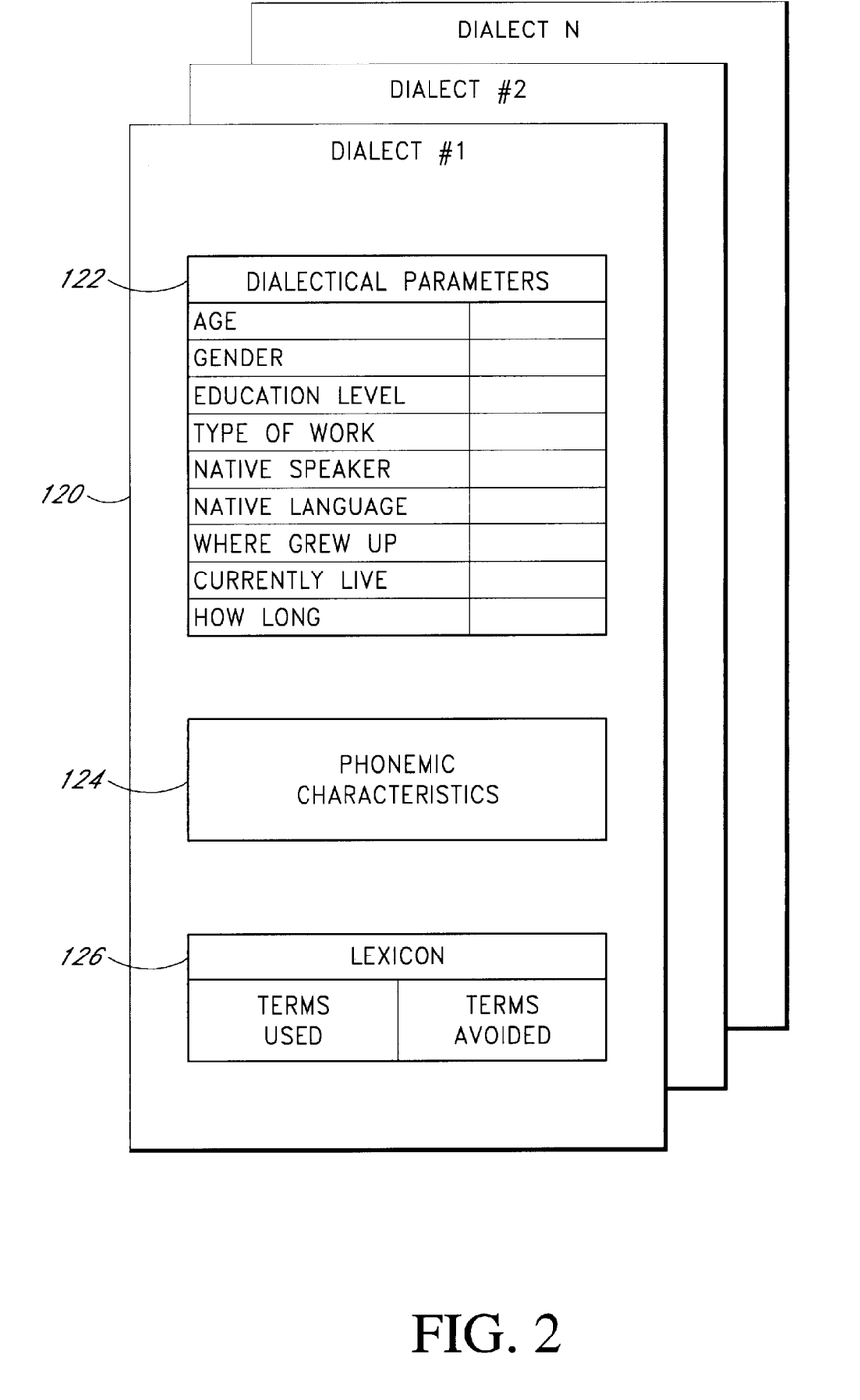
FIG. 2 shows the data structure of a typical dialect record in memory.

The two-way speech recognition and dialect system 100 also comprises software adapted to enact the various features of the two-way speech recognition and dialect system 100 as will be described in greater detail below. The memory 106 is provided with an array of dialect records 120. An example dialect record 120 is shown in FIG. 2. Each dialect record 120 contains parameter structures 122 with information defining a dialect. In this embodiment, a dialect is defined by the speaker's age, gender, level of education, type of work they do, whether they are a native speaker of the language or not, if not what their native language is, where they grew up, where they currently live, and how long they have lived there.

Each dialect record 120 also contains data structures 124 defining phonemic characteristics specific to that dialect. The phonemic characteristics are the typical ways speakers of a particular dialect pronounce different words and phrases. It will be appreciated that the phonemic characteristic data structure 124 may define particular rules of pronunciation relating to particular dialects. For example, in some dialects, the letter "h" is not pronounced at the beginning of words. As another example, dialects are not just regional differences or educational differences in the manner in which a person speaks, it may also be the result of age or sex. The phonemic characteristics data structure 124 may also contain frequency information for the dialects of children or adult female speakers as the frequency or pitch of their voice is generally higher than with adult male speakers and knowing this information will assist the processor 104 in correlating text words with received audio words in the manner that will be described in greater detail below.

Each dialect record 120 may also contain a lexicon database 126 containing any words or phrases that are unique to the dialect. The lexicon database 126 may contain a complete lexicon of each recognized dialect or it may contain simply those words that are unique to a particular database that can not be determined by the processor by applying the phonemic characteristics 124. It is understood that to determine a particular word from an audio signal, certain general rules can be applied to recognize some words, e.g., a child will generally speak in a higher pitch than an adult. Hence, to determine the word, the processor 104 may simply frequency transform the digital signal and compare it to a standard database or lexicon of words. Alternatively, there are also certain pronunciations of words that are associated with a particular dialect that are not rule based, e.g., the use of the word "y'all" for all of you, in the Southern United States. The lexicon 126 can either include entire dialectic pronunciations of words or it can contain a pointer to a standard lexicon and selected special case pronunciations for particular dialects.

It will be appreciated that there can be any of a number of different ways of organizing the data structures of the system 100. The organization illustrated in FIG. 2 is simply illustrative of one possible manner of organizing and storing the data and should not be viewed as a limitation of the manner of implementing the present invention.

Figure 3:
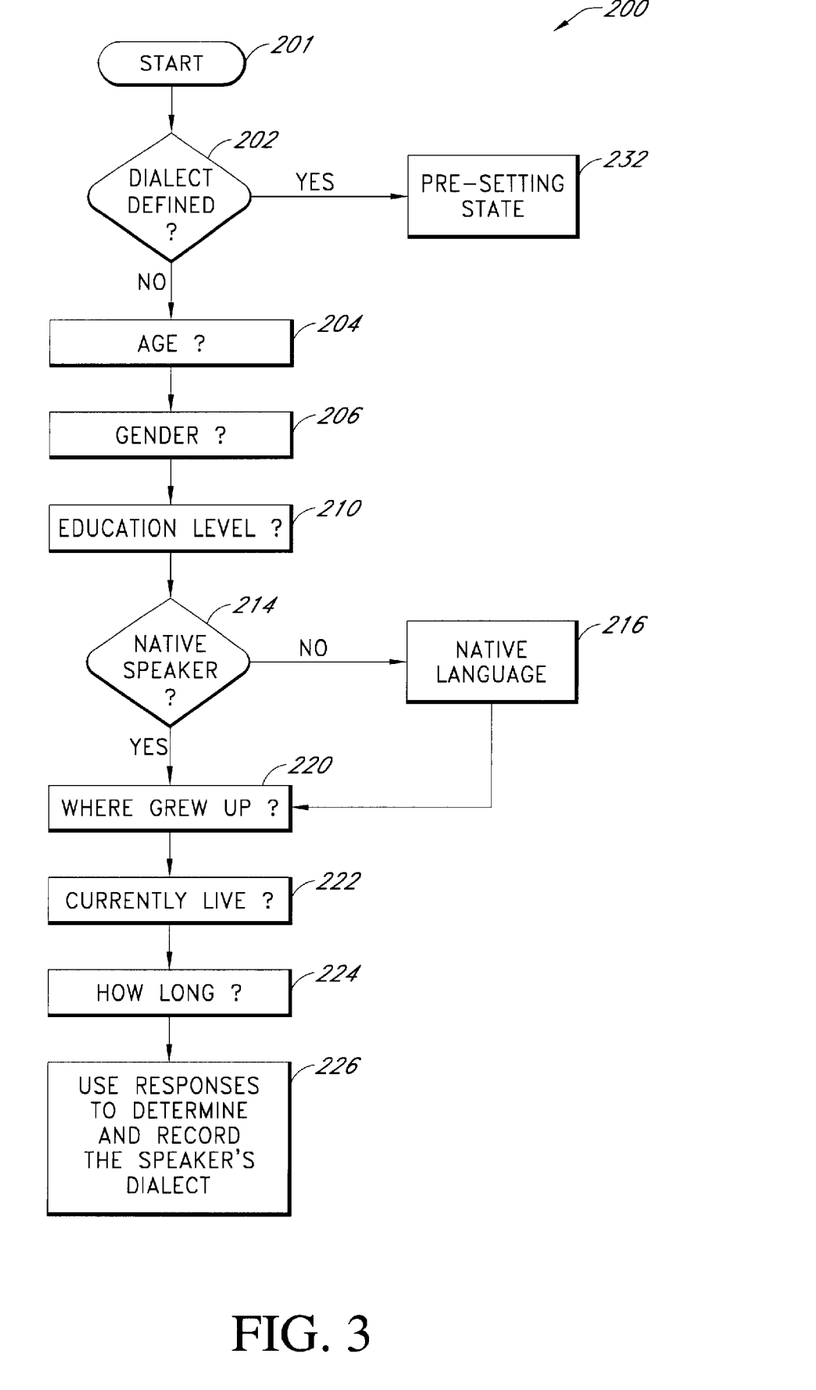
FIG. 3 is a flow chart depicting the dialect determination process.

FIG. 3 shows a flow chart of the manner in which the two-way speech recognition and dialect system 100 performs a dialect determination 200 whereby the two-way speech recognition and dialect system 100 decides what the dialect of the user is. The user initiates the dialect determination 200 by providing a start command 201 via the input device 112 to instruct the two-way speech recognition and dialect system 100 to start training. The two-way speech recognition and dialect system 100 determines in decision state 202 whether the dialect of the user has been defined. If it has, the two-way speech recognition and dialect system 100 skips the dialect determination 200 and jumps to a pre-setting state 232 that will be described in greater detail below.

If the user's dialect is not defined, the dialect determination 200 proceeds through a series of parameter queries. The two-way speech recognition and dialect system 100 presents a question to the user via the user interface 110 and awaits a response from the user via the input device 112. The user interface 110 can present the query as a dialog box on a monitor, an audio question via a speaker, or any of various other methods well known in the art. The response via the input device 112 can comprise typing a response on a keyboard, touching a particular place on a touch-screen, providing a verbal response to the sound transducer 102, or any of various other types of input methods well known in the art. Once the two-way speech recognition and dialect system 100 has received a valid response to the query, the two-way speech recognition and dialect system 100 stores the response in the memory 106 and proceeds to the next query until the series of questions is completely answered.

In this example, the two-way speech recognition and dialect system 100 queries the user for their age in state 204, their gender in state 206, their level of education in state 210, and the type of work they do in state 212. The two-way speech recognition and dialect system 100 then queries the user in state 214 whether they are a native speaker. If they are not, the two-way speech recognition and dialect system 100 proceeds to state 216 wherein the two-way speech recognition and dialect system 100 queries the user for their native language. If the two-way speech recognition and dialect system 100 determines in state 214 that the user is a native speaker, the two-way speech recognition and dialect system 100 skips state 216. In either case, the two-way speech recognition and dialect system 100 then continues querying the user for the location they grew up in state 220, where they currently live in state 222, and how long they have lived there in state 224.

The two-way speech recognition and dialect system 100 uses the responses provided to the queries described above to determine in state 226 which of the available dialect records 120 most closely match the user. The processor 104 can select the dialect record 120 based upon a logical determination process that correlates the available dialect records 120 with the responses to the questions. The exact manner of selecting the dialect record 120 will, of course, vary based upon the application. However, if a person is an adult male from the southern United States of limited education, the processor 104 can select a dialect record 120 that corresponds to the particular dialect that this person is most likely to have.

Figure 4:
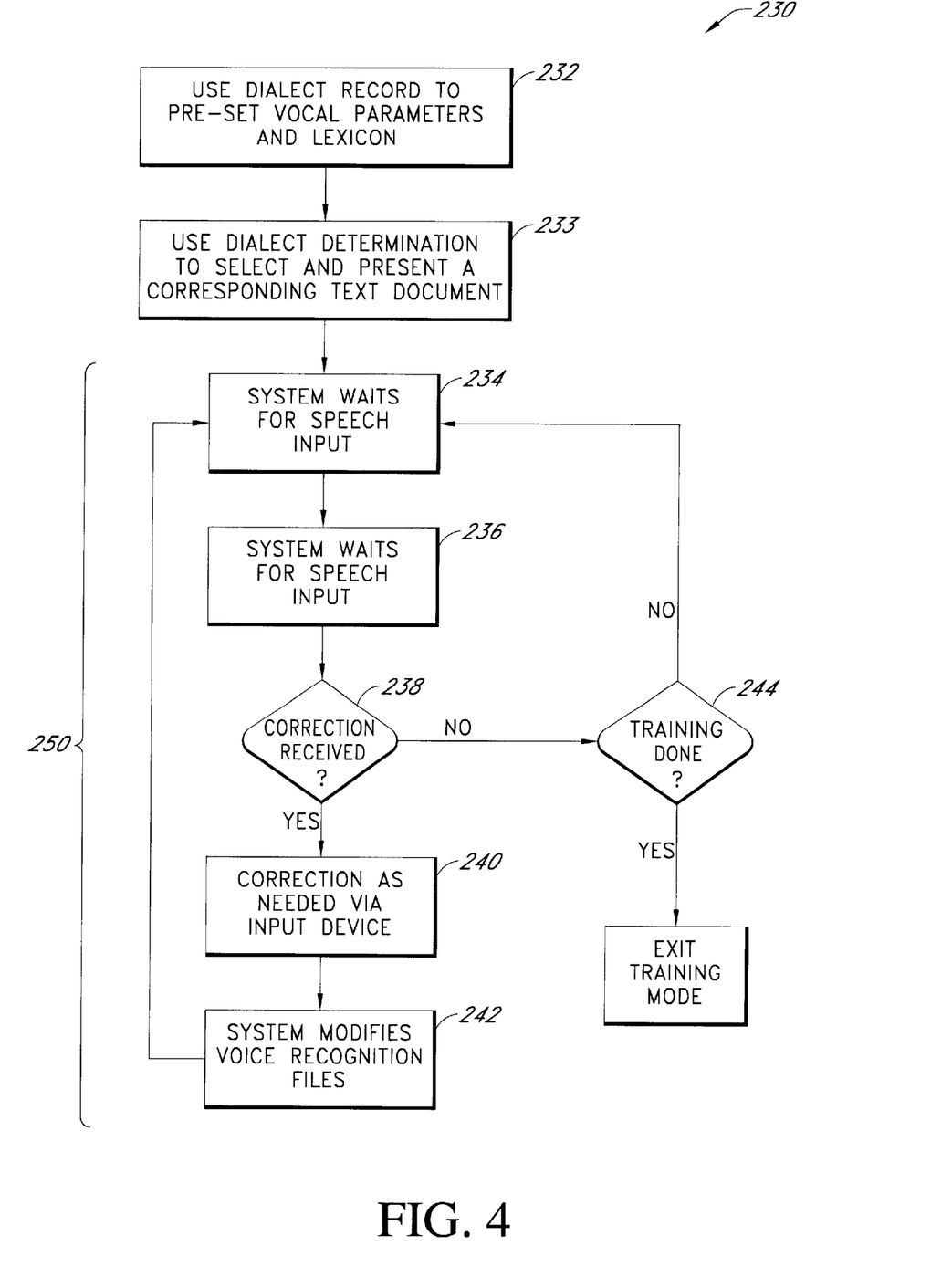
FIG. 4 is a flow chart depicting the actions the two-way speech recognition and dialect system performs during speech-to-text conversion.

Once the two-way speech recognition and dialect system 100 has determined the closest dialect match, the two-way speech recognition and dialect system 100 in this embodiment commences a training mode 230 as shown in FIG. 4. The training mode 230 allows the user to read aloud one of a set of pre-defined text documents. The multiple text documents are constructed to emphasize the aspects of each particular dialect that are known to be difficult to distinguish and recognize. The text document chosen for the training mode 230 corresponds to the dialect determined in the dialect determination 200 as previously described. The two-way speech recognition and dialect system 100 compares the text generated as the selected text document is read aloud to the original text document, and make corrections as needed. By knowing in advance which words to expect, in what order, and a general pronunciation pattern, the two-way speech recognition and dialect system 100 is able to more rapidly and accurately match the user's spoken words with corresponding text and to be able to do so with a smaller text document.

In the pre-setting state 232, the two-way speech recognition and dialect system 100 uses the phonemic parameters contained in the dialect record 120 selected in state 226 to pre-set the tonal qualities, pronunciation, and word usage that the two-way speech recognition and dialect system 100 expects from the speaker. The two-way speech recognition and dialect system 100 then presents a selected text document as described previously in state 233 via the user interface 110. The presentation of state 233 includes a prompt to read a sequence of the selected sample text aloud into the sound transducer 102 and the two-way speech recognition and dialect system 100 waits to receive speech input in state 234. The two-way speech recognition and dialect system 100 then generates a corresponding set of text using the phonemic characteristic 124 data and the lexicon 126 data from the selected dialect data structure 120 and presents the text via the user interface 110 in state 236 in a manner well known to those skilled in the art. The user then reviews the generated text for accuracy while the two-way speech recognition and dialect system 100 waits in decision state 238 for a correction input or further speech input. If the two-way speech recognition and dialect system 100 generated accurate text, the user continues to the next sequence of sample text and reads it aloud into the sound transducer 102 and the two-way speech recognition and dialect system 100 returns to state 234.

If the two-way speech recognition and dialect system 100 made any errors with the transcription, the user indicates the correction needed via the input device 112. The two-way speech recognition and dialect system 100 then modifies its files to match the received vocal pattern with the intended text in correction state 242 in a known manner. The two-way speech recognition and dialect system 100 monitors in decision state 244 whether the user has completed the set of sample text. Once the final sequence of sample text is correctly transcribed, the two-way speech recognition and dialect system 100 exits the training mode 230. By knowing in advance the words to expect and more or less how the speaker will pronounce them, the two-way speech recognition and dialect system 100 is able to significantly reduce the learning time needed for reliable speech-to-text conversion.

It will be appreciated that the learning or training sequence described above is one of a number of iterative processes that can be used to train the two-way speech recognition and dialect data base system 100. It should be appreciated that regardless of the actual learning or training sequence used to train a system to recognize a particular user, obtaining parameters indicative of the speaker's dialect greatly simplifies the training routine as the system 100 is better able to recognize words that are spoken in the particular dialect. Moreover, it will also be appreciated that with systems that do not require training, obtaining the dialect data prior to operation greatly enhances the accuracy of the system.

Once the two-way speech recognition and dialect system 100 has completed the training mode 230, the two-way speech recognition and dialect system 100 can enter a run mode 250. The run mode 250 comprises waiting for the user to speak in state 234, transcribing the speech into text in state 236, and waiting for corrective input in decision state 238. The run mode 250 also comprises correcting the generated text in state 240 and modifying the two-way speech recognition and dialect system system's 100 files in state 242 as necessary. It should be understood that the speech-to-text transcription is a continuous process and the correction state 240 and modification state 242 previously described are coded to operate as parallel processes to the text transcription. Thus the two-way speech recognition and dialect system 100 is able to update its performance to track changes in the speaker's vocal patterns in the normal course of use.

Figure 5:
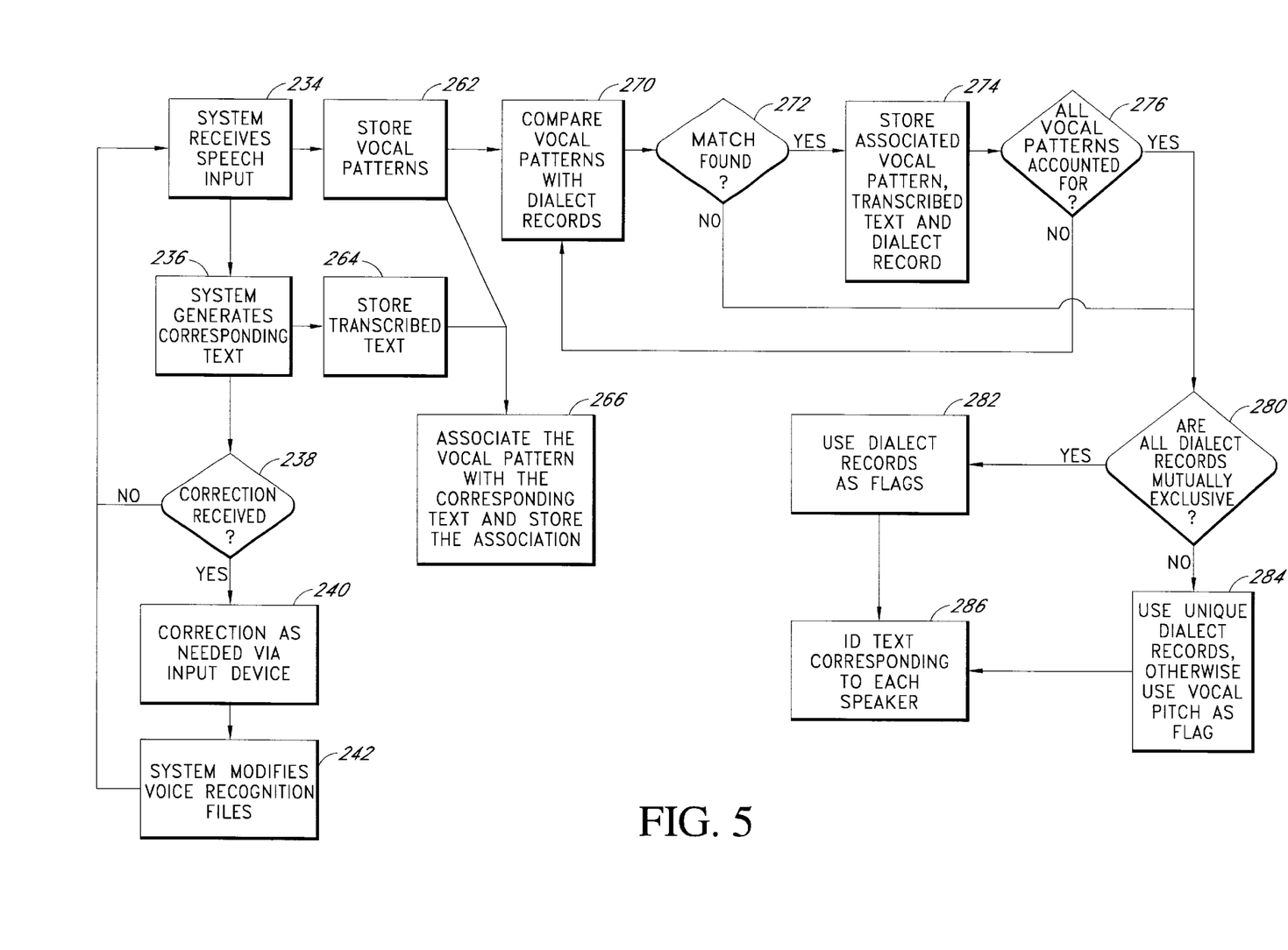
FIG. 5 is a flow chart showing the operation of the two-way speech recognition and dialect system with multiple speakers.

In another embodiment, the two-way speech recognition and dialect system 100 is adapted to perform a speech-to-text conversion with multiple speakers and to distinguish between the multiple speakers as shown in FIG. 5. The two-way speech recognition and dialect system 100 need not perform the dialect determination 200 or the training mode 230 previously described. Instead, the two-way speech recognition and dialect system 100 performs a multi-speaker mode 260 that is substantially similar to the run mode 250 previously described, however in this embodiment there are multiple speakers.

The two-way speech recognition and dialect system 100 receives the users' speech in state 234 and generates corresponding text in state 236 in the manner previously described. The two-way speech recognition and dialect system 100 also determines in state 238 whether corrective input has been received in state 240 and if so, modifies the two-way speech recognition and dialect system system's 100 speech recognition files as needed in state 242 in the manner previously described. As the two-way speech recognition and dialect system 100 receives speech in state 234, the two-way speech recognition and dialect system 100 stores the vocal patterns of the speech in memory 106 in state 262. In a similar manner, the two-way speech recognition and dialect system 100 stores the text generated in state 236 in memory 106 in state 264. As the two-way speech recognition and dialect system 100 receives and stores vocal patterns in states 234 and 262 and generates and stores corresponding text in states 236 and 264, the two-way speech recognition and dialect system 100 associates and records the association of the vocal patterns and corresponding text in state 266.

The two-way speech recognition and dialect system 100 compares the observed vocal characteristics stored in state 262 to the array of dialect records 120 in memory 106 in state 270. As the two-way speech recognition and dialect system 100 is performing the comparison of state 270 the two-way speech recognition and dialect system 100 waits in decision state 272 for a match to be made. When a match is found, the two-way speech recognition and dialect system 100 stores the association between a vocal pattern, the corresponding text, and the dialect record 120 in state 274. The two-way speech recognition and dialect system 100 then determines in decision state 276 whether all of the vocal patterns have been accounted for. If all the vocal patterns have not been associated with a dialect record 120, the two-way speech recognition and dialect system 100 returns to state 270.

If all of the vocal patterns have been accounted for, the two-way speech recognition and dialect system 100 proceeds to decision state 280, wherein the two-way speech recognition and dialect system 100 determines whether the dialect records 120 selected for the multiple speakers are mutually exclusive. If the dialect records 120 are all mutually exclusive, the two-way speech recognition and dialect system 100 uses the dialect records 120 as a flag to distinguish the speech and corresponding text associated with each speaker in state 282. If the dialect records 120 are not all mutually exclusive, the two-way speech recognition and dialect system 100 uses any dialect records 120 that are unique as flags and uses the tonal pitch of the speaker for the remaining vocal records and corresponding text as flags in state 284.

The two-way speech recognition and dialect system 100 continues to receive speech in state 234 and record the vocal patterns in state 262 as well as transcribe the received speech into text in state 236 and store the transcribed text in state 264. The two-way speech recognition and dialect system 100 uses the flags set in state 282 or 284 to identify the transcribed text corresponding to each speaker by highlighting the different speakers' text in different colors or fonts on the user interface 110 or with other methods well understood in the art in state 286. By transcribing the text of multiple speakers and distinguishing and identifying the transcribed text corresponding to each speaker without requiring any input from the users other than their normal speech, the two-way speech recognition and dialect system 100 offers a convenient, unobtrusive method of multi-speaker speech transcription.

It will be appreciated that the two-way speech recognition and dialect system 100 can determine dialects in the same manner as described above for each of the individuals. The two-way speech recognition and dialect system 100 can ask each of the speakers a series of questions to obtain dialect parameters that are indicative of the dialect of each of the speakers. Once the dialect has been determined for each of the speakers, the system can use this information, either by itself, or in conjunction with other identifying cues such as pitch of voice, modeled patterns of conversation, etc. to identify each of the speakers while preparing written transcripts of oral conversations.

From the foregoing it will be appreciated that the system of the illustrated embodiments provides a system which is better able to perform speech to text translation as a result of initially determining the dialect of the speakers by ascertaining dialect parameters from the speakers. This either reduces the learning time and/or it improves the accuracy of the speech to text transcription performed by the system.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. A system for transcribing spoken words to text, the system comprising:

an audio transducer that receives the spoken words and generates speech signals corresponding thereto;

a user interface through which a user can receive and send signals;

at least one data structure containing word data correlating text representations of words to speech signals wherein the at least one data structure includes dialect parameter data that can be used to recognize selected dialects corresponding to selected users;

a processor that receives the speech signals from the audio transducer wherein the processor compares the speech signals to the word data in the at least one data structure to produce text representations corresponding to the spoken words and wherein the processor initially sends signals to the user via the user interface asking the user questions indicative of the user's dialect to thereby induce the user to provide answer signals to the processor that are indicative of dialect parameters and wherein the processor compares the dialect parameters from the user to the dialect parameter data in the at least one data structure to determine a dialect corresponding to the user prior to comparing the speech signals to the word data in the at least one data structure to produce text representations corresponding to the spoken words.

2. The system of claim 1, wherein the at least one data structure includes phonemic characteristic data corresponding to one of a plurality of dialects and wherein the processor, upon determining a dialect corresponding to the user, uses the corresponding phonemic characteristic data to facilitate recognition of text words in the word data corresponding to the speech signals.

3. The system of claim 1, wherein the at least one data structure includes at least one lexicon of words corresponding to a selected dialect and the processor, upon determining that the user has the selected dialect, uses the at least one lexicon of words corresponding to the selected dialect to translate the speech signals into the text representations corresponding to the spoken words.

4. The system of claim 1, wherein the dialect parameters include parameters indicative of the physical characteristics of the speaker.

5. The system of claim 4, wherein the dialect parameters include the age and sex of the speaker.

6. The system of claim 1, wherein the dialect parameters include parameters indicative of the geographical origin of the speaker.

7. The system of claim 6, wherein the dialect parameters include where the speaker grew up, the native language of the speaker, where the speaker currently resides and how long the speaker has resided in the speaker's current location.

8. The system of claim 1, wherein the dialect parameters include parameters indicative of the educational level of the speaker.

9. The system of claim 1, wherein the audio transducer comprises a microphone assembly.

10. The system of claim 1, wherein the user interface includes a monitor, keyboard, and a mouse.

11. The system of claim 1, wherein the data structure further includes a plurality of text documents corresponding to each dialect and wherein the system presents the text document corresponding to the dialect determined for the user so that the user can read the text document aloud and wherein the system compares the text generated from the reading of the text document to the actual content of the text document and performs a self-correction process to improve the accuracy of the speech-to-text transcription and wherein each text document is adapted to minimize the time required for the system to perform the self-correction process.

12. The system of claim 1, wherein the spoken words originate from multiple speakers and wherein the processor sends signals to multiple users via at least one user interface to induce the users to provide signals to the processor that are indicative of dialect parameters and wherein the processor compares the dialect parameters from the users to the dialect parameter data in the at least one data structure to determine dialects corresponding to the users prior to comparing the speech signals to the word data in the at least one data structure to produce text representations corresponding to the spoken words and wherein the processor uses the dialect parameter data in the at least one data structure to associate the received speech signals with the corresponding text representation corresponding to each speaker and wherein the processor identifies the representative text corresponding to each speaker in a distinguishable manner.

13. The system of claim 12, wherein identifying the representative text corresponding to each speaker in a distinguishable manner comprises displaying the representative text via a user interface in different font types.

14. A machine loadable software program adapted to control the operation of a processor such that the processor translates audio word signals indicative of at least one word spoken by a speaker into corresponding text signals in response to receiving the audio word signals from an audio transducer wherein the software program further induces the processor to obtain dialect parameters from the speaker prior to receiving audio word signals from the speaker by inducing the processor to ask questions of the speaker indicative of the speaker's dialect such that the speaker provides the dialect parameters via a user input device associated with the processor and wherein the software program induces the processor to determine the speaker's dialect from the dialect parameters prior to translating the audio word signals into corresponding text signals so as to improve the efficiency of the processor in correlating text words to received audio word signals.

15. The program of claim 14, wherein the program further receives from at least one data structure phonemic characteristic data corresponding to one of a plurality of dialects and wherein the program induces the processor, upon determining a dialect corresponding to the user, to use the corresponding phonemic characteristic data to facilitate recognition of text words in the word data corresponding to the audio word signals.

16. The program of claim 14, wherein the program further receives from at least one data structure at least one lexicon of words corresponding to a selected dialect and the program further induces the processor, upon determining that the speaker has the selected dialect, to use the at least one lexicon of words corresponding to the selected dialect to translate the speech signals into the text representations corresponding to the received audio word signals.

17. The program of claim 14, wherein the dialect parameters include parameters indicative of the physical characteristics of the speaker.

18. The program of claim 17, wherein the dialect parameters include the age and sex of the speaker.

19. The program of claim 14, wherein the dialect parameters include parameters indicative of the geographical origin of the speaker.

20. The program of claim 19, wherein the dialect parameters include where the speaker grew up, the native language of the speaker, where the speaker currently resides and how long the speaker has resided in the speaker's current location.

21. The program of claim 14, wherein the dialect parameters include parameters indicative of the educational level of the speaker.

22. The program of claim 14, wherein the program further induces the processor to present a text document after determining the speaker's dialect wherein the processor instructs the speaker to read the text document aloud and wherein the processor compares the text generated from the reading of the text document to the content of the text document and further makes corrections to the program's transcription so as to improve subsequent of unknown spoken words and wherein the text document presented corresponds to the dialect determined for the speaker such that the time required for the correct is reduced.

23. A method of translating spoken words into corresponding text words, the method comprising:
 obtaining dialect parameter data from a speaker by asking the speaker questions indicative of dialect and then evaluating the answers;
 determining a dialect of the speaker from the dialect parameter data;
 receiving spoken words from the speaker after having determined the dialect of the speaker; and
 using the dialect of the speaker to facilitate correlation of the spoken word to corresponding text words.

24. The method of claim 23, wherein obtaining dialect parameter data from the speaker comprises providing signals to the speaker thereby inducing the speaker to provide response signals indicative of the dialect parameters.

25. The method of claim 23, wherein determining the dialect of the speaker comprises comparing the obtained speaker's dialect parameter data to dialect parameter data.

26. The method of claim 23, wherein receiving spoken words from the speaker comprises transducing the speaker's speech with a microphone.

27. The method of claim 23, wherein using the dialect of the speaker to facilitate correlation of spoken words into corresponding text comprises selecting phonemic data corresponding to the dialect to interpret audio signals as corresponding to text signals contained within a database.

28. The method of claim 27, wherein using the dialect of the speaker to facilitate correlation of spoken words into corresponding text further comprises presenting a text document corresponding to the dialect of the speaker, directing the speaker to read the text document aloud, comparing the text transcribed from the spoken text to the content of the text document, and making corrections to the correlation so that the text signals in the database are more closely matched with the audio signals.

29. A method of translating spoken words into corresponding text words, the method comprising:

obtaining dialect parameter data from a plurality of speakers by asking the plurality of speakers questions indicative of dialect and evaluating the answers;

determining the dialects of the speakers from the dialect parameter data;

receiving spoken words from the speakers after having determined the dialects of the speakers;

using the dialects of the speakers to correlate the spoken words to corresponding text words; and using the dialects of the speakers to identify the text words corresponding to each speaker.

30. The method of claim 29, further comprising distinguishing the text words corresponding to each speaker by presenting the text words corresponding to each speaker in different colors.

* * * * *